Sept. 20, 1938.  J. J. ECKLES  2,130,792
VEHICLE BODY STABILIZER
Filed Sept. 3, 1936  2 Sheets-Sheet 1
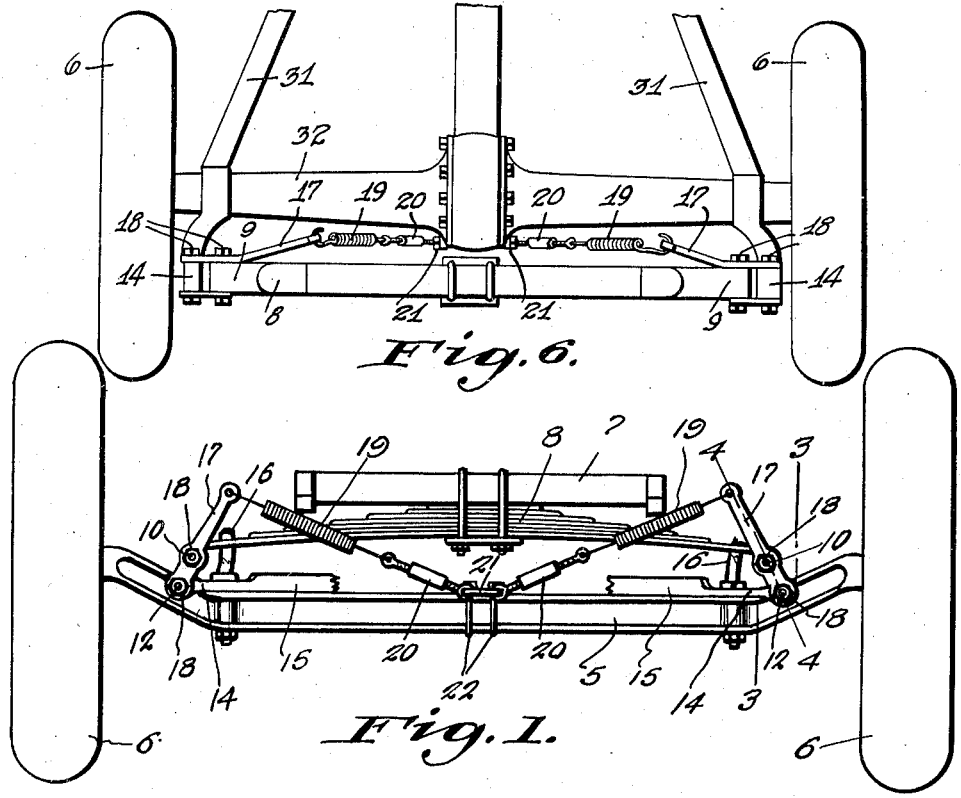
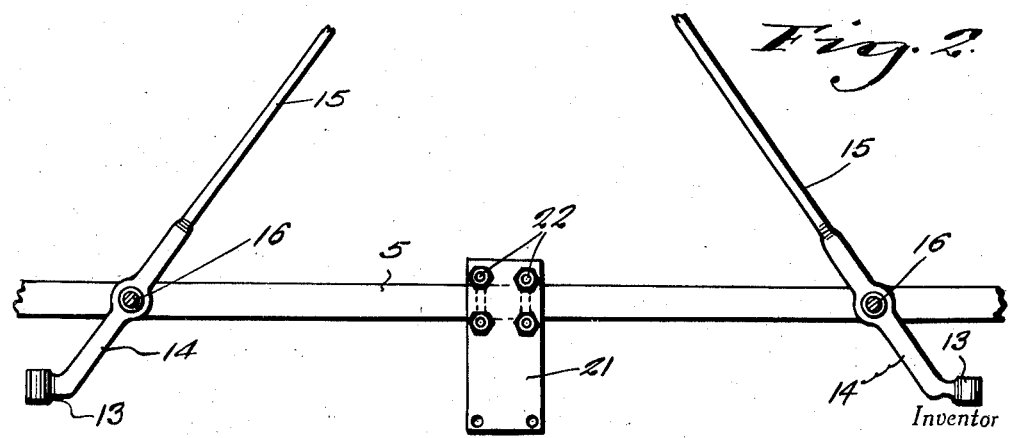
Inventor
James Jewell Eckles
By Clarence A. O'Brien
Hyman Berman
Attorneys Sept. 20, 1938.   J. J. ECKLES   2,130,792
VEHICLE BODY STABILIZER
Filed Sept. 3, 1936   2 Sheets-Sheet 2
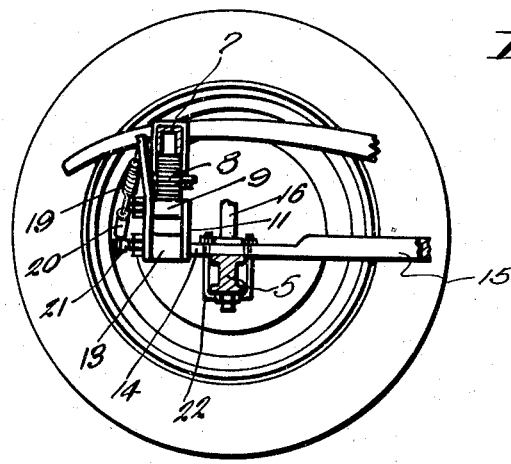
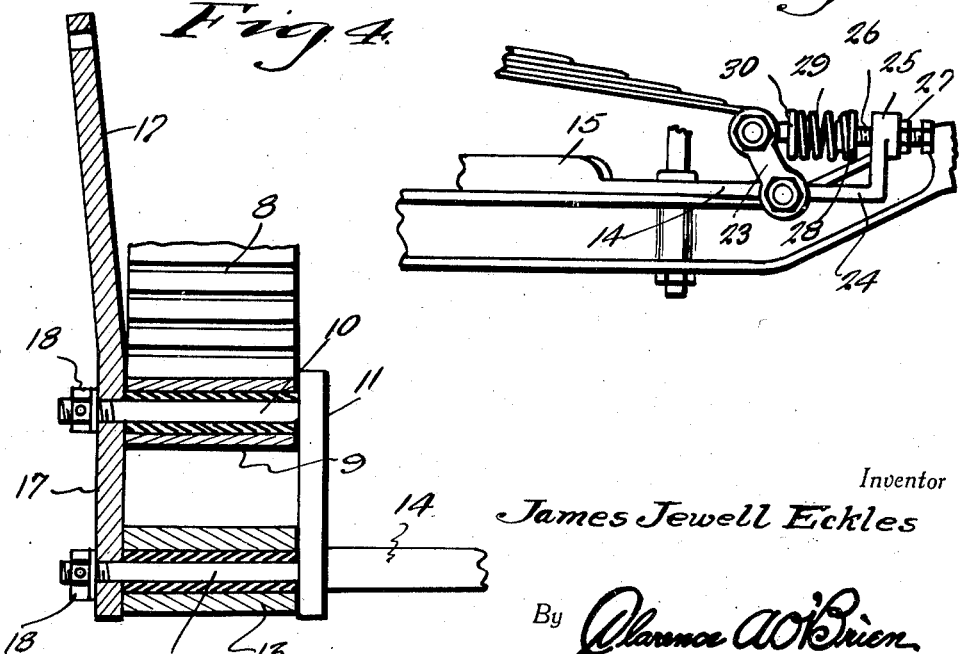
Inventor
James Jewell Eckles
By Clarence A. O'Brien
Hyman Berman
Attorneys Patented Sept. 20, 1938

2,130,792

UNITED STATES PATENT OFFICE 2,130,792

VEHICLE BODY STABILIZER

James Jewell Eckles, Washington, D. C.

Application September 3, 1936, Serial No. 99,281

8 Claims. (Cl. 267—17)

The present invention relates to vehicles and more particularly to a stabilizer for the body of the vehicle. More specifically the invention comprises means interposed between the spring and the axle at the front and/or rear of an automobile to prevent tilting of the body, caused by centrifugal force tending to cause the body to lean to the outside of the arc it follows while rounding curves, or when at rest or in motion on any road where there is sufficient transverse slope to cause the body of an automobile to tilt.

One of the important objects of the present invention is to provide a body stabilizing attachment of this character which may be installed in operative position upon automobiles of conventional types without necessitating any changes in the construction or alteration thereof.

A further object is to provide an attachment of this character of simple and practical construction, which is strong and durable, relatively inexpensive to manufacture and otherwise well-adapted for the purposes for which the same is intended.

Other objects and advantages reside in the details of construction and operation as more fully hereinafter described and claimed, reference being had to the accompanying drawings forming part thereof wherein like numerals refer to like parts throughout and in which:

Figure 1 is a front elevational view of an automobile showing the body stabilizing attachment in position thereon.

Figure 2 is a fragmentary top plan view of the axle and radius rod for the front of a conventional type of automobile and which forms the mounting for the present invention.

Figure 3 is a vertical sectional view taken substantially on the line 3—3 of Figure 1.

Figure 4 is a fragmentary vertical sectional view taken substantially on the line 4—4 of Figure 1, and Figure 5 is a fragmentary elevational view of a vehicle axle illustrating a modified form of the invention.

Figure 6 is a detail showing of the device mounted on the rear axle of the vehicle.

Referring now to the drawings in detail, wherein for the purpose of illustration I have disclosed a preferred embodiment of invention, the numeral 5 designates the axle of an automobile providing a mounting for the wheel 6. In the present embodiment of invention the body frame of the vehicle is shown at 7 supported on springs 8, the ends of the springs being provided with eyes 9 journaled on one arm 10 of a substantially U-shaped spring shackle 11. The opposite arm 12 of the shackle extends through an eye 13 formed on the forwardly projecting end 14 of a radius rod 15 secured to the axle as at 16. The above construction differs from the conventional spring suspension of certain types of automobiles in that the spring shackles 11 extend upwardly and inwardly from their point of support on the forward end 14 of radius rod 15 to their connection in bearing 9 on each end of the spring 8 instead of downwardly and inwardly from these respective points, so further detailed explanation thereof is not deemed necessary.

The outer ends of the shackle arms 10 and 12 are connected by a lever 17 having opening therein for receiving said arms and secured in position by nuts 18. One of the levers 17 is provided for each end of the spring and each lever extends upwardly and inwardly with respect to the shackle at an inclined angle as more clearly illustrated in Figure 1 of the drawings. To the upper end of each of the levers is attached a coil spring 19 which extends upwardly with respect to the shackles at an inclined angle as more clearly illustrated in Figure 1 of the drawings. To the upper end of each of the levers is attached a coil spring 19 which extends inwardly toward the center of the axle, the opposite end of the spring being connected to a turn buckle 20, which in turn is attached to a plate 21 secured to the axle by U-bolts 22.

These levers and attached coil springs with turn buckle tension adjustments are utilized to prevent the spring shackles from falling completely over to either side when yielding to any side stress, but to hold them in a position of flexible balance.

In the modified form of the invention illustrated in Figure 5 of the drawings, the lever 17 is dispensed with and the free ends of the shackle arms are connected by a plate 23 in the usual manner. In this form of the invention the radius rod 14 is formed with an extension 24 provided with an upstanding eye 25 through which a bolt 26 is threaded and secured in threadedly adjusted position by a lock nut 27. The end of the bolt 26 is formed with a head 28 which engages one end of a coil spring 29, the opposite end of the spring abutting a lug 30 projecting outwardly from the shackle.

In either of the above described forms of the invention the method of application to the rear axle and spring is the same as that described for the front axle and spring, except that the lower end of the spring shackles are supported on brackets extending rearwardly from the rear radius rods 31 secured to the rear axle housing 32 as shown in Figure 6, instead of on the forward projecting part of the radius rod as applied to the front.

From the foregoing it is believed that the operation and advantages of the invention will be apparent. In turning a curve the usual tendency of the body of an automobile is to rise upwardly at one side and lower correspondingly on the other side, which tendency is counteracted in the present invention by the fact that the side that would customarily be depressed by any side thrust acting against the opposite side will be raised by the lifting of the upper end of the inverted spring shackle on that side, while the same stress will correspondingly lower end of the inverted spring shackle on the other side of the vehicle. Accordingly the natural tendency of the automobile to tilt will be counteracted and the body will be maintained in a substantially level position. In fact, if sufficiently long spring shackles are used, their lifting and lowering action will actually cause the body of the automobile to bank or lean toward the inside of a curve while running.

What is claimed as new is:—

1. A vehicle stabilizer comprising in combination, a vehicle axle having radius rods extending forwardly therefrom, a vehicle body spring, spring shackles connected at one end to said radius rods and extending upwardly and inwardly therefrom and having their upper ends connected to said spring, a lever extending upwardly and inwardly from each of the shackles and springs connecting the upper ends of the lever to a stationary part of the vehicle not carried by the vehicle spring to retard movement of the shackles in a predetermined direction.

2. A vehicle stabilizer comprising in combination, a vehicle axle having radius rods extending forwardly therefrom, a vehicle body spring, upwardly and inwardly extending spring shackles connecting the ends of the springs to the forward ends of the radius rods, a lever extending upwardly and inwardly from each of the shackles and springs connecting the free ends of the lever to a stationary part of the vehicle not carried by the vehicle spring to retard movement of the shackles in a predetermined direction.

3. A vehicle stabilizer comprising in combination, a vehicle axle having radius rods extending forwardly therefrom, a vehicle body spring, upwardly and inwardly extending spring shackles connecting the ends of the spring to the forward ends of the radius rods, a lever extending upwardly and inwardly from each of the shackles, springs connected at one end to each of the levers, a plate secured to the axle and turn buckles connecting the last named spring to said plate.

4. A vehicle stabilizer comprising in combination, a vehicle axle having radius rods extending forwardly therefrom, a vehicle body spring, spring shackles connecting the ends of the spring to the forward ends of the radius rods, a bolt adjustably carried thereby and a spring interposed between the bolt and the shackle to retard movement of the shackle in a predetermined direction.

5. A vehicle stabilizer comprising in combination, a vehicle axle housing having brackets extending rearwardly therefrom, a vehicle body spring, spring shackles extending upwardly and inwardly from where they are supported on the axle housing brackets to where they connect with the vehicle body spring, and spring means acting upon the shackles to maintain them in their approximate described position.

6. A vehicle stabilizer comprising in combination, a vehicle axle, spring shackle supporting means carried by the axle adjacent each end thereof, spring shackles rising from and having their lower ends pivoted to the shackle supporting means and having their upper ends inclined toward each other, a substantially horizontally disposed vehicle body spring having its ends connected to the upper portion of said shackle, and spring means directly engaging the shackles above the pivot of the shackle supporting means and acting upon the shackles to maintain them in their approximate described position.

7. A vehicle stabilizer comprising in combination, a vehicle axle, spring shackle supporting means carried by the axle adjacent each end thereof, spring shackles rising from and having their lower ends pivoted to the shackle supporting means and having their upper ends inclined toward each other, a vehicle body spring having its ends connected to the upper portion of said shackles, the adjacent ends of the vehicle body springs being off-set with respect to the longitudinal axis of the respective shackles and spring means directly engaging the shackles above a pivot of the shackle supporting means and acting upon the shackles to maintain them in their approximate described position.

8. A vehicle stabilizer comprising in combination, a vehicle axle having radius rods extending forwardly therefrom, a vehicle body spring, spring shackles pivoted at their lower ends to the forward ends of the radius rod and extending upwardly and inwardly therefrom, said shackles also being connected to said vehicle body spring and spring means directly engaging the shackles above their lowermost connection and acting upon the shackles to maintain them in their approximate described position.

JAMES JEWELL ECKLES.